US011913146B1

(12) United States Patent
Fairchild et al.

(10) Patent No.: US 11,913,146 B1
(45) Date of Patent: Feb. 27, 2024

(54) CARBON NANOTUBE YARN CATHODE USING TEXTILE MANUFACTURING METHODS

(71) Applicant: Government of the United States, as represented by the Secretary of the Air Force, Wright-Patterson AFB, OH (US)

(72) Inventors: Steven B. Fairchild, Beavercreek, OH (US); John J. Boeckl, London, OH (US); Genevieve Dion, Philadelphia, PA (US); Chelsea Amanatides, Philadelphia, PA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 377 days.

(21) Appl. No.: 16/933,048

(22) Filed: Jul. 20, 2020

Related U.S. Application Data

(60) Provisional application No. 62/875,547, filed on Jul. 18, 2019.

(51) Int. Cl.
*D04B 1/04* (2006.01)
*D03D 1/00* (2006.01)
(Continued)

(52) U.S. Cl.
CPC ................. *D04B 1/04* (2013.01); *D01F 9/12* (2013.01); *D03D 1/00* (2013.01); *D03D 15/275* (2021.01);
(Continued)

(58) Field of Classification Search
CPC ................ D10B 2101/122; H01J 1/304; H01J 2201/30469; D03D 27/00–18; D03D 1/0088; D04B 1/02–04; D04B 21/02–04
See application file for complete search history.

(56) References Cited

U.S. PATENT DOCUMENTS 6,941,775 B2 * 9/2005 Sharma .................. D04B 1/123
66/171
7,147,533 B2 * 12/2006 Kawate ................... C23C 16/26
445/51
(Continued)

FOREIGN PATENT DOCUMENTS

KR 10-1162881 B1 * 5/2021

OTHER PUBLICATIONS

"KR101162881_Machine Translation" is a machine translation of KR 10-1162881 B1. (Year: 2012).*

*Primary Examiner* — Larissa Rowe Emrich
(74) *Attorney, Agent, or Firm* — AFMCLO/JAZ; Richard M. Mescher

(57) ABSTRACT

An electrode comprising a conductive textile structure having an inner surface that is connected to one of an electrical power supply and an electrical ground; the conductive textile structure having an outer surface, the outer surface comprising a carbon nanotube (CNT) fiber fabric fixed thereon, the CNT fiber fabric having continuous CNT fiber on the outer surface, wherein the CNT fiber fabric comprises at least one of a CNT fiber, and is at least one of knitted, woven, sewn, and embroidered. The continuous CNT fiber may be a yarn, ribbon, or thread. The CNT fiber fabric includes at least one face having a looped or interlaced structure made from the continuous CNT fiber. The CNT fiber yarn, ribbon, or thread is knitted, woven, sewn, and/or embroidered so that at least one surface comprises a textile made with CNT fiber yarns, ribbons, or threads.

12 Claims, 15 Drawing Sheets
(12 of 15 Drawing Sheet(s) Filed in Color)

(51) Int. Cl.

| | |
|---|---|
| ***D03D 15/275*** | (2021.01) |
| ***D01F 9/12*** | (2006.01) |
| ***H01J 1/304*** | (2006.01) |

(52) U.S. Cl.
CPC ........ *H01J 1/304* (2013.01); *D10B 2101/122* (2013.01); *D10B 2401/16* (2013.01); *H01J 2201/30469* (2013.01)

(56) References Cited

U.S. PATENT DOCUMENTS

| | | | | |
|---|---|---|---|---|
| 8,766,517 | B2 * | 7/2014 | Silvernail | H01L 51/5203 313/511 |
| 8,766,522 | B1 | 7/2014 | Fairchild et al. | |
| 9,337,474 | B1 * | 5/2016 | Fischel | H01G 11/26 |
| 10,714,293 | B1 | 7/2020 | Fairchild | |
| 2009/0289555 | A1 * | 11/2009 | Jiang | H01J 1/304 313/355 |
| 2013/0263351 | A1 * | 10/2013 | Tao | D02G 3/441 174/128.1 |

* cited by examiner

Low Voltage (1kV) DC test stand for testing field emission cathodes

FIG. 7A
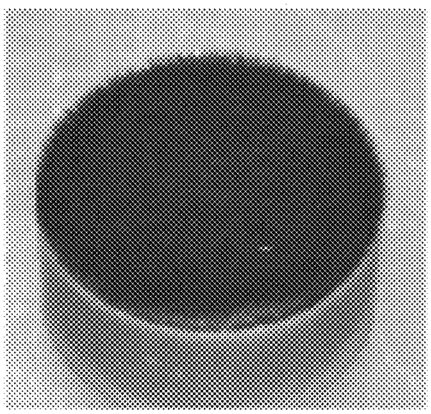
Carbon fiber
FIG. 7B
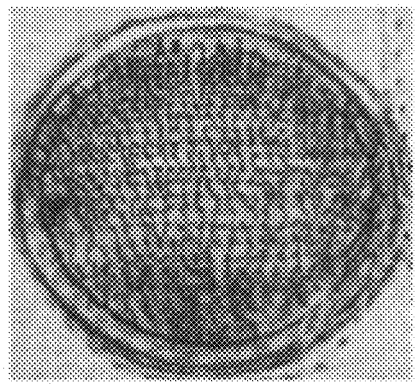
CNT-fiber
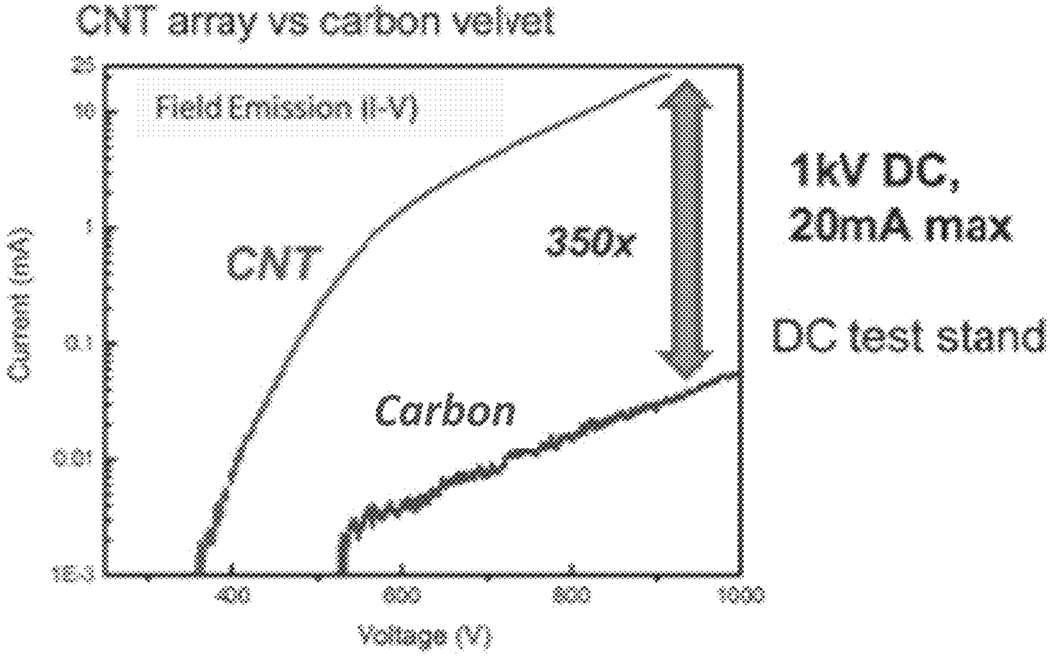
FIG. 7C

High Voltage (30kV pulsed mode test stand for testing field emission cathodes
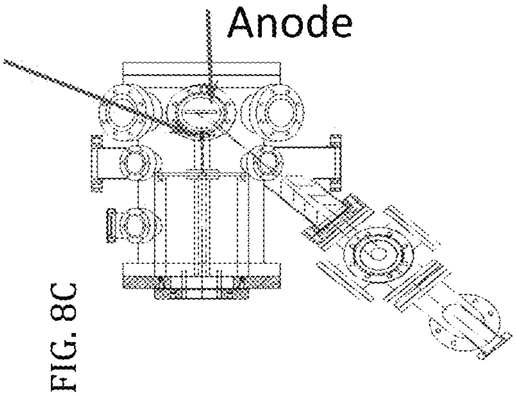
FIG. 8C
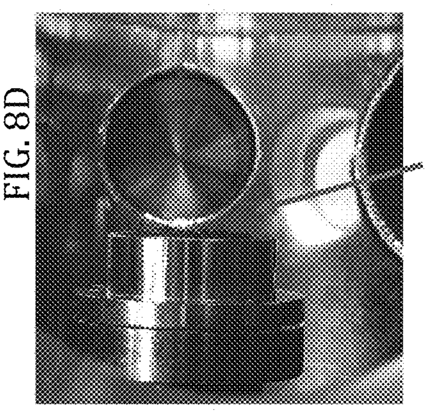
FIG. 8D
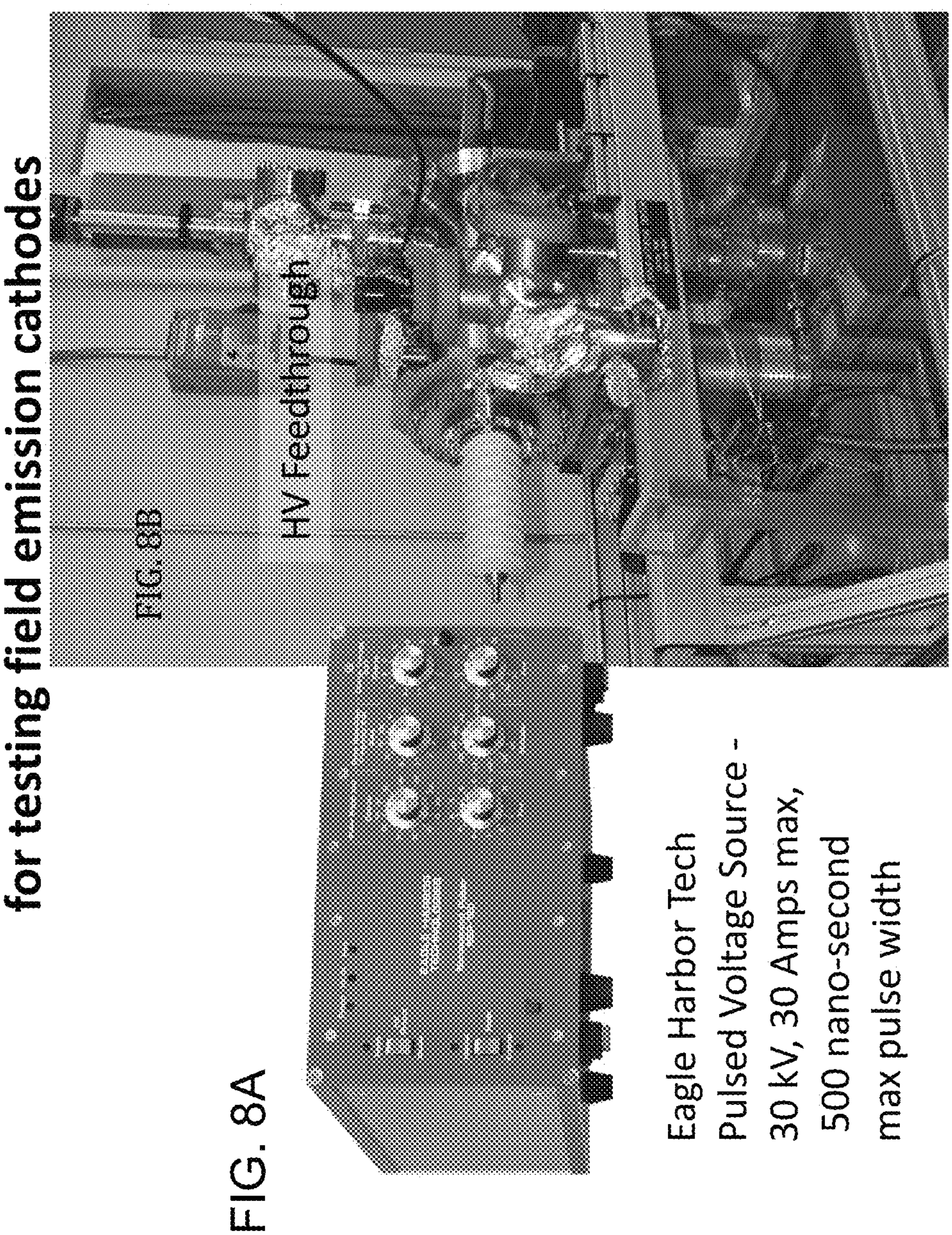
FIG. 8B
FIG. 8A FIG. 11A Jersey
–Technical Front
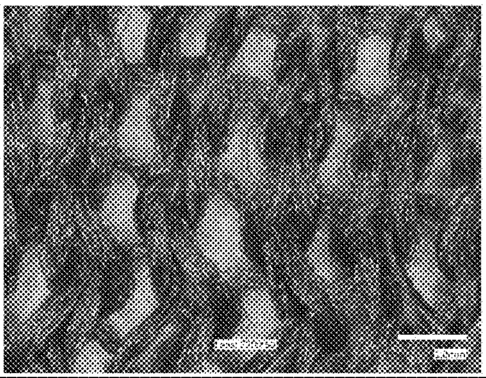
FIG. 11B Jersey
–Technical Back
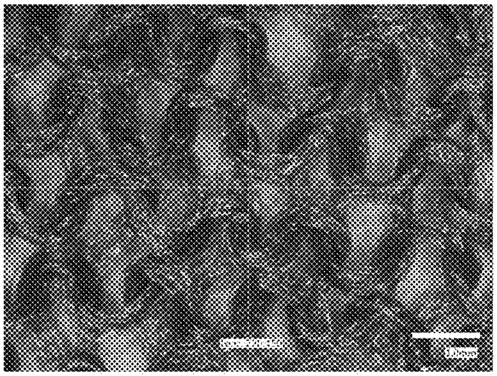
FIG. 11C Garter
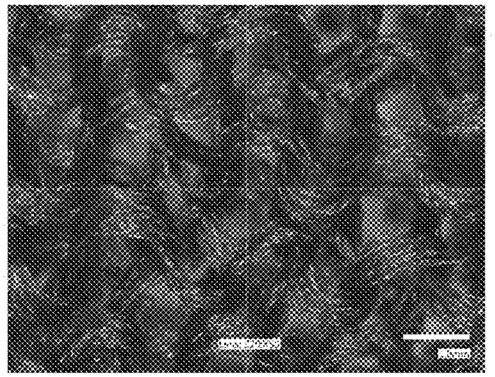
FIG. 11 D 1x1 Rib
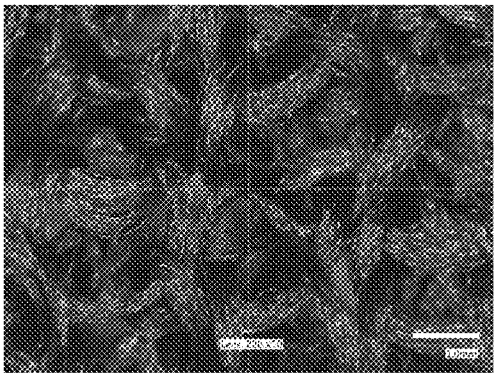
FIG. 11E Interlock
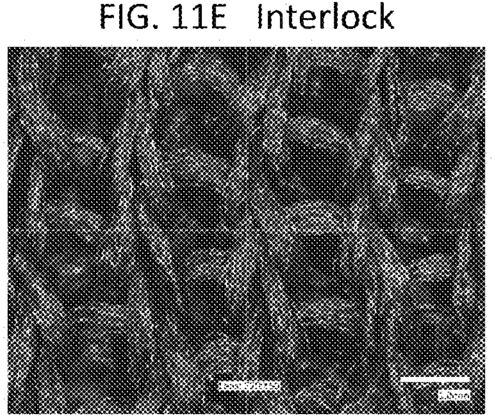

FIG. 13A
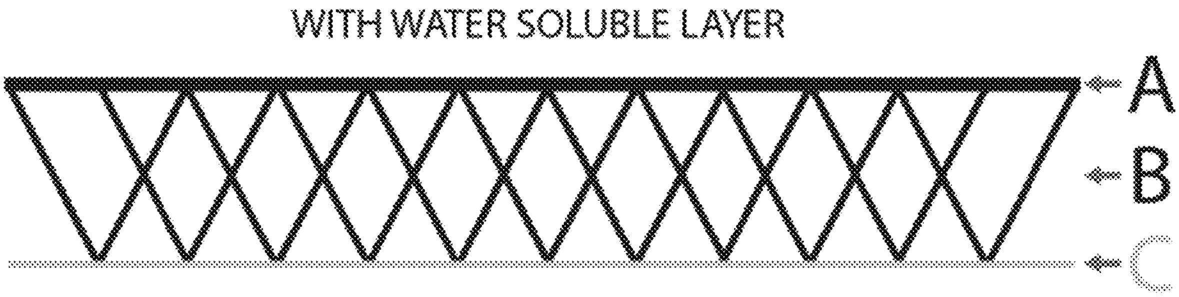
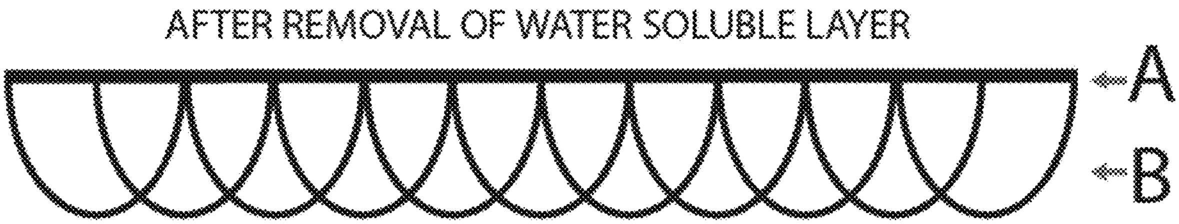
FIG. 13B
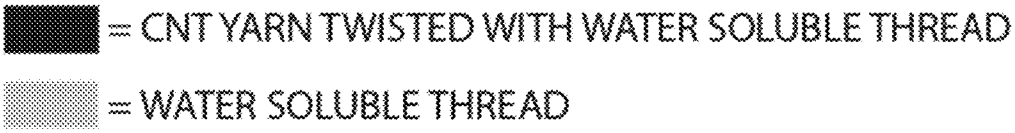

CARBON NANOTUBE YARN CATHODE USING TEXTILE MANUFACTURING METHODS

CROSS REFERENCE TO RELATED APPLICATIONS

This application claims the benefit under 35 U.S.C. § 119(e) of U.S. Provisional Patent Application Ser. No. 62/875,547, filed on 18 Jul. 2019, the entire contents of which are hereby incorporated herein by reference.

FIELD OF THE INVENTION

The present invention relates generally to field emission cathodes made from carbon nanotube fibers, and more particularly to cathodes made with carbon nanotube (CNT) textiles, i.e. bulk carbon nanotube fiber yarns, ribbons, and/or threads which are fabricated into textiles using existing textile fabrication techniques.

BACKGROUND OF THE INVENTION

Typical field emission cathodes are made with high aspect ratio wire or fiber type structures that are mounted on a substrate. The fibers are rigid and vertically mounted so they point towards the electric field. This type of vertical geometry results in a large concentration of electric field lines at the tip of the fiber which leads to field emission of electrons. This process can be accompanied by intense localized heating and plasma formation at the fiber tip. This results in erosion of the fiber tip and eventual breakdown and failure of the cathode.

The current state of the art cathode material, e.g. for use in High Power Electromagnetic (HPEM) devices, is rigid carbon fiber (see FIGS. 1A-1B). The devices are made by a technique called flocking. Flocking is the process of depositing many small fiber particles (called flock) onto an adhesive-coated surface. This process is accomplished with the application of a high-voltage electric field. In a flocking machine the "flock" is given a negative charge while the substrate is grounded. Flock material flies vertically onto the substrate, attaching to the previously-applied adhesive and creating a velvet-like surface consisting of vertically-aligned carbon fibers. These surfaces are then used as field emission cathodes in HPEM systems. The diameter of the individual flocked fibers is only a few thousandths of a centimeter and lengths range from 0.25-5 mm.

Macroscopic CNT fibers may also be vertically mounted on a horizontal substrate, i.e. the CNT fibers are orthogonal to the substrate. These fibers are made with diameters ranging from 10-100 μm. Multiple fibers can be twisted together into yarns, or threads having diameters on the scale of 1 mm, they can also be made into ribbons. When used as vertically mounted cathodes the CNT fibers must be cut to a specific length either mechanically or with a laser. However, since the CNT fibers are not stiff they will lean or droop making it difficult to mount multiple fibers that are all vertical and the same height, which is critical for use as a field emission cathode. Additionally, the mechanically-cut tips usually introduce rough edges with dangling fibrils (see FIGS. 2A-2B). Laser cutting largely reduces the tip roughness, however, the fiber tips are still spread out at the ends, i.e. frayed ends. The rough edges of the frayed ends and tip spread are undesirable. The rough edges lead to non-uniform emission and uneven temperature distribution and hotspots at the fiber tips.

What is desired are materials which are better able to withstand the rigors of use in a field emission device or related structure.

The present invention overcomes the foregoing problems and other shortcomings, drawbacks, and challenges of field emission cathodes for HPEM devices. While the invention will be described in connection with certain embodiments, it will be understood that the invention is not limited to these embodiments. To the contrary, this invention includes all alternatives, modifications, and equivalents as may be included within the spirit and scope of the present invention.

SUMMARY OF THE INVENTION

The present invention overcomes the foregoing problems and other shortcomings, drawbacks, and challenges of electrodes for high-power applications. While the invention will be described in connection with certain embodiments, it will be understood that the invention is not limited to these embodiments. To the contrary, this invention includes all alternatives, modifications, and equivalents as may be included within the spirit and scope of the present invention.

The invention includes using continuous carbon nanotube (CNT) fiber yarns, ribbons or threads, that are knitted, woven, sewn, and/or embroidered to form a CNT textile. When used as a cathode the CNT fiber structure will be mounted to a conductive substrate, e.g. conductive structure, with a conductive contact by techniques such as electroplating, vacuum brazing, silver or graphite epoxy, or epoxies containing nano-structured carbon, e.g. CNTs or graphene flake, or other conductive epoxies and paints. The CNT fiber yarns, ribbons, and/or threads may be knitted, woven, sewn, and/or embroidered using existing textile manufacturing equipment which are known for making structures from continuous yarns, ribbons, or threads. When used as a cathode the CNT fiber structure may then be bonded to a planar or cylindrical metal or electrically-conductive structure for larger area coverage.

In another embodiment, the CNT fiber structure may be formed in a single operation in a 3D knitting process. The final structure may be comprised completely of CNT fiber yarn, ribbon, or thread, or may be a hybrid structure with the CNT fiber yarn, ribbon, or thread employed with metallic yarn, ribbon, or thread for use as an aid for structural support or substrate bonding. For hybrid structures the metallic fiber yarn, ribbon, or thread and the CNT fiber yarn, ribbon, or thread are integrated together in one piece.

According to one embodiment of the present invention an electrode comprises a conductive textile structure having an inner surface that is connected to one of an electrical power supply and an electrical ground; the conductive textile structure having an outer surface, the outer surface comprising a carbon nanotube (CNT) fiber fabric fixed thereon, the CNT fiber fabric having continuous CNT fiber on the outer surface, wherein the CNT fiber fabric comprises at least one of a CNT fiber, and is at least one of knitted, woven, sewn, and embroidered.

The electrode may be a cathode, field emission device, an electron emitter, and a conformable electrode. The continuous CNT fiber is at least one of a yarn, ribbon, or thread.

The CNT fiber fabric includes at each one face having a looped or interlaced structure made from the continuous CNT fiber. The CNT fiber fabric may be knitted, woven, sewn, or embroidered so that at least one of the outer surface and the inner surface comprises the CNT fiber fabric.

The CNT fiber fabric may comprise at least one of a weft knit structure, a weft knit plating structure, a self-folding weft knit structure, a knit or woven terrycloth structure, a sewn structure, an embroidered structure, a warp knit structure, and a 3D knit spacer fabric structure that forms at least one of an outer surface or an inner surface of the electrode.

The electrode may further include a conductive bond between the conductive structure and the CNT fiber fabric. The conductive bond between the conductive structure and the CNT fiber fabric may comprise one or more of a conductive adhesive, such as a carbon-based epoxy, a silver epoxy, a CNT-containing adhesive, a nanocarbon-containing adhesive, electroplating bond, or vacuum brazing The CNT fiber fabric may further include at least one additional conductive yarn, ribbon or thread such as stainless steel or graphite/carbon or copper.

The weft knit structure, or their analogous warp knit structure, may be made in a variety of knit stitch patterns including but not limited to a jersey knit, a garter knit, a rib knit, and/or an interlock knit. The weft knit plating structure may further comprise a second yarn, ribbon, or thread material selected from the group consisting of a conductive yarn, a stainless steel yarn, and a graphite/carbon yarn, or a copper yarn.

The terrycloth structure is at least one of a weft-knitted terrycloth, a warp-knitted terrycloth, and a woven terrycloth.

Each of the variations described above may be combined in any manner desired so as to achieve a particular technical effect.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention. The patent or application file contains at least one drawing executed in color. Copies of this patent or patent application publication with color drawing(s) will be provided by the Office upon request and payment of the necessary fee.

FIGS. 7A-7C present a comparison of a prior art flocked carbon fiber cathode (image (a)) and a hand-sewn CNT fiber cathode (image (b)), as well as the initial DC voltage experimental comparison of the prior art flocked carbon fiber cathode and a hand-sewn CNT fiber cathode.

FIGS. 8A-8D depict a High Voltage Diagnostic System which consists of a 30 kV voltage source (FIG. 8A) and a vacuum chamber with high voltage feedthrough (FIG. 8B), along with a schematic of the vacuum chamber showing location of cathode and anode (FIG. 8C), and an image from inside the vacuum chamber showing a mounted CNT fiber textile cathode (FIG. 8D).

FIGS. 11A-11E present various weft knit structures that may be made with CNT fiber yarns, ribbons, or threads that may be used to make CNT fiber cathodes using industrial textile fabrication methods.

FIGS. 13A-13B present diagrammatic perspective views of the weft knit structure used to produce the CNT fiber fabric and field emission electrode of FIGS. 9A-9B, with FIG. 13A illustrating the weft knit structure with a water-soluble thread, and FIG. 13B illustrating the weft knit structure after removal of the water-soluble thread.

DETAILED DESCRIPTION OF THE INVENTION

Figure 3B:
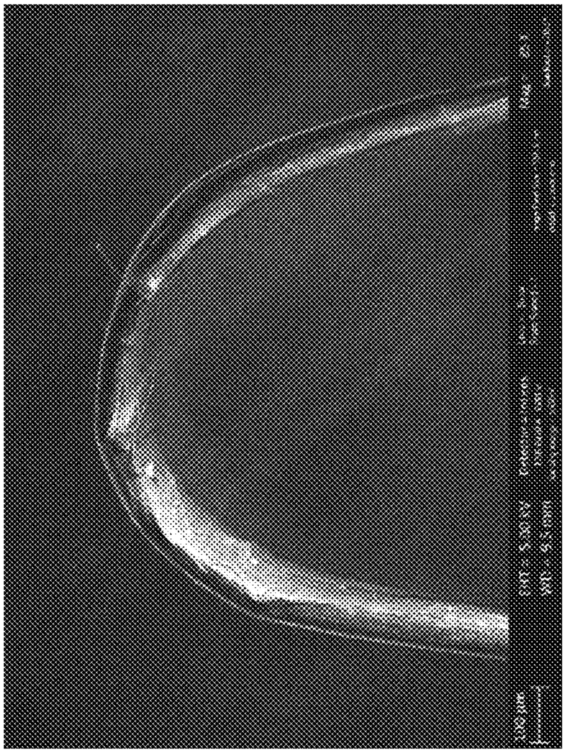
FIGS. 3A-3B present a scanning electron microscope (SEM) image of a single vertical (FIG. 3A) and looped (FIG. 3B) 90 μm diameter carbon nanotube (CNT) fiber.
Figure 3A:
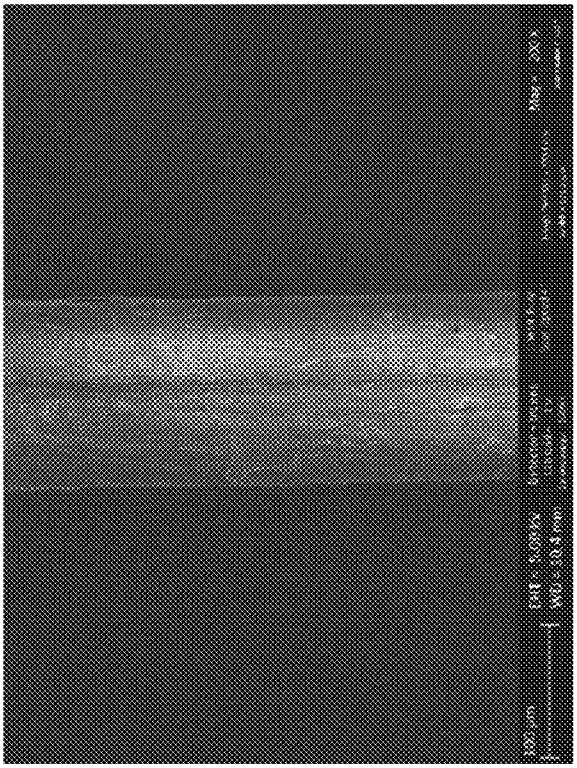
Figure 4B:
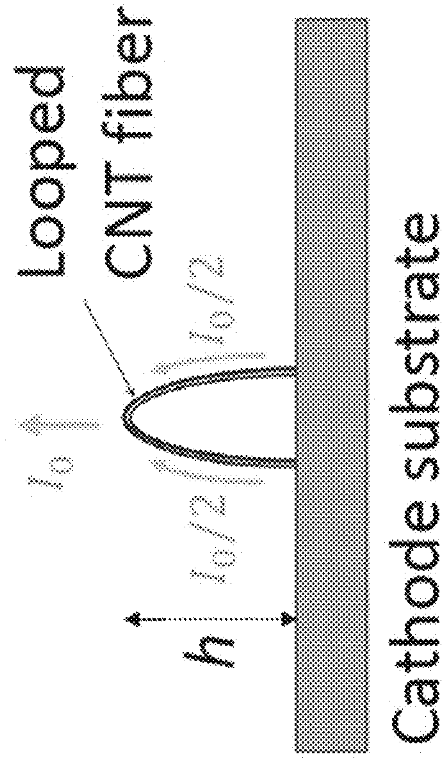
FIGS. 4A-4B illustrate a vertical fiber (FIG. 4A) vs a looped fiber (FIG. 4B) emitter geometry.
Figure 4A:
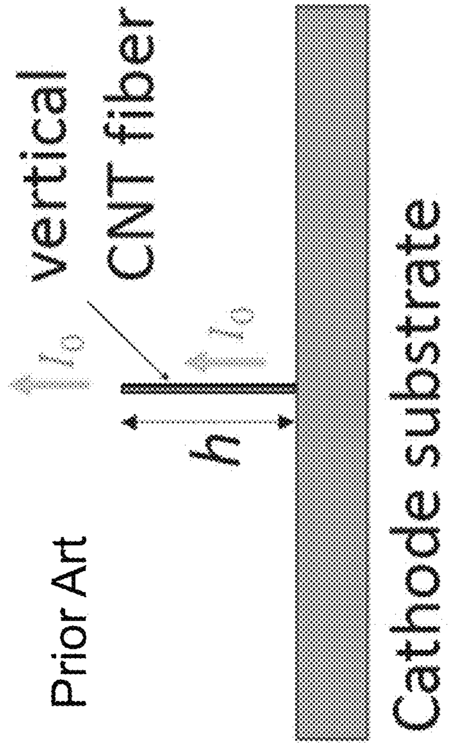
Figures 5A, 5B, 5C, 5D:
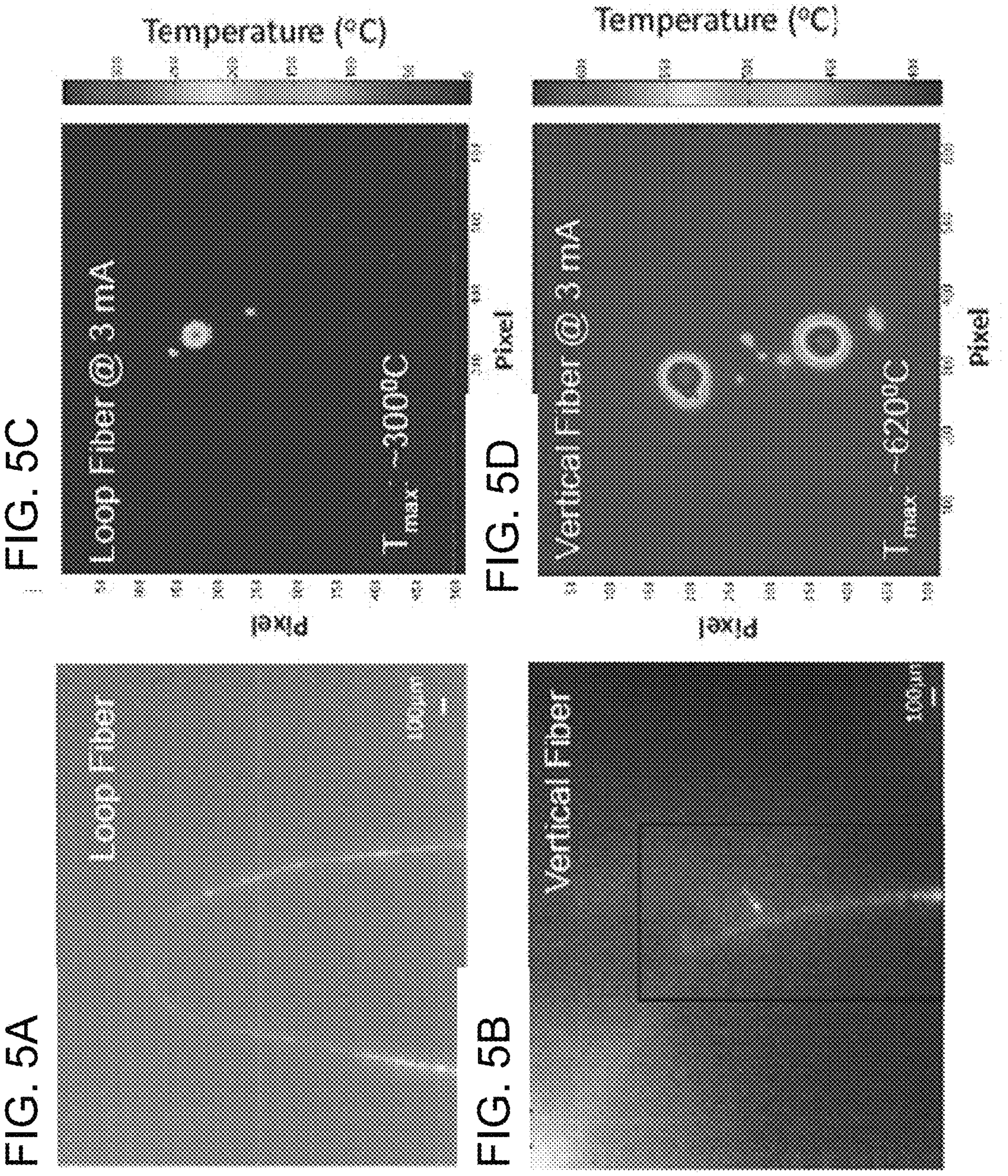
FIGS. 5A-5D show the fiber temperature during emission for a vertical fiber emitter (FIGS. 5B and 5D) vs a looped fiber emitter (FIGS. 5A and 5C).
Figure 6A:
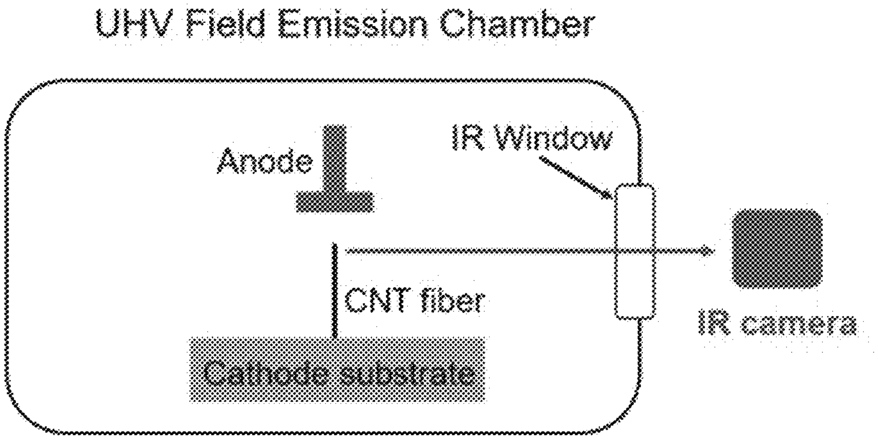
FIGS. 6A-6B illustrate a field emission test chamber used to evaluate the field emitters under DC testing conditions.
Figure 6B:
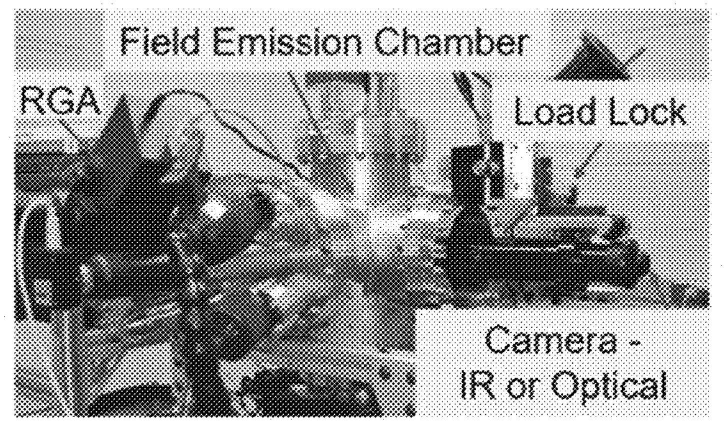

We have demonstrated that the CNT fiber flexibility (see FIGS. 3A-3B) allows them to be mounted in a looped structure, as illustrated in FIGS. 4A-4B. FIGS. 5A-5D show the results of FE experiments performed on both vertically-mounted and looped CNT fibers. The fiber temperature was measured during FE with an infrared camera (see FIGS. 6A-6B). For an emission current of 3 mA, the temperature of the looped fiber was one half that of the vertically mounted fiber. This significantly lower operating temperature is desirable for an FE cathode as it leads to longer cathode lifetime.

Macroscopic fibers comprised solely of carbon nanotubes (CNT) have demonstrated significant promise for use as field emission (FE) cathodes. CNT fibers have demonstrated a superior ability to emit electrons when placed under the influence of an applied field. Many vacuum electronic devices rely on FE cathodes that generate electron beams in vacuum, and low voltage, low temperature emission is desirable for reliable cathode performance and lifetime. CNT fibers are now commercially available and can be spooled into long lengths. In addition, they are flexible (see FIGS. 3A-3B and 5A-5D) and do not lose conductivity when bent.

The cathode in a vacuum tube or other vacuum system emits an electron beam into the vacuum tube. Hot cathodes operate by thermionic emission and require excessive heating (i.e. 1,600-2,000° C.) of the cathode for electron emission to occur. This is in contrast to a cold cathode, which does not have a heating element, and operates by field emission, whereby electrons are emitted from the cathode under the influence of an applied electric field. Carbon nanotube (CNT) fiber cathodes operate in the cold field emission mode and are capable of emitting a high current density electron beam. Field emission cathodes made from continuous or looped CNT fiber yarn, ribbon, or thread have demonstrated superior performance over flocked carbon fiber. A 1" diameter looped CNT fiber array exhibits much lower turn-on voltage and produces 350× more current than a 1" diameter flocked carbon fiber cathode for the same applied field (see FIG. 7C) under DC testing conditions. This leads to lower power requirements and lower operating temperatures, resulting in less plasma formation in the vacuum gap and more efficient device operation (see FIG. 10D).

High power electromagnetic (HPEM) devices are used across multiple platforms that require the generation of RF energy that propagates through the atmosphere over considerable distances. Military applications of interest include satellite communications, radar, and high-power microwave weapons. Next generation systems require reduced SWaP (size, weight, and power) for more efficient operation, ease of transport, and reduced complexity for system integration. These requirements present challenges for the HPEM source, since a reduction in size is accompanied by an increase in internal field strengths which places more stress on source components, particularly the cathode that generates the electron beam. The operation of an HPEM device requires highly efficient and robust field emission (FE) cathodes; macroscopic fibers made from carbon nanotubes (CNTs) have demonstrated significant enhancements in system performance due to their low field strength, and low temperature operation. These property improvements over existing cathode technologies permit enhanced HPEM device performance on a smaller scale.

Figure 1B:
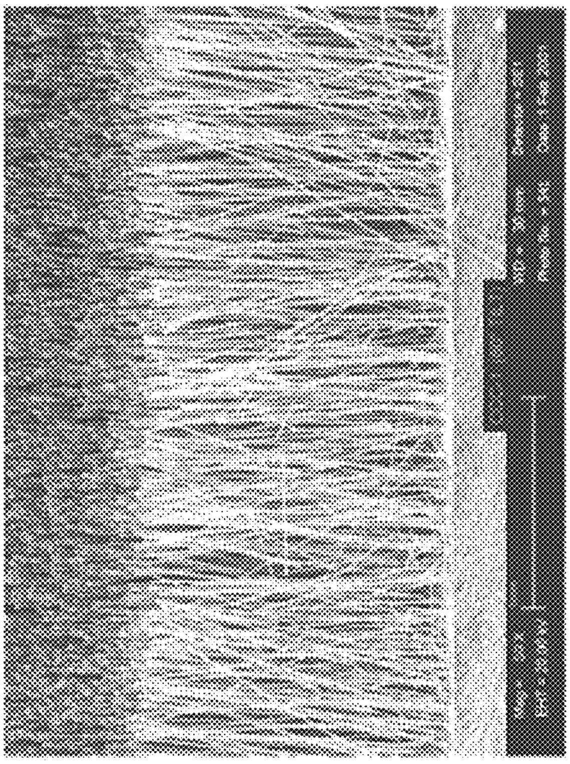
FIGS. 1A-1B present images of a prior art field emission cathode made from flocked carbon fiber.
Figure 1A:
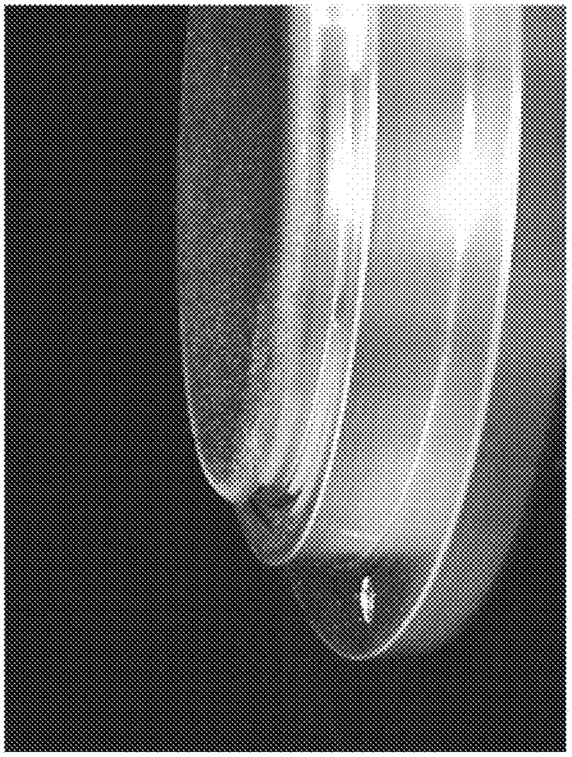
FIG. 1A Prior Art
Figure 2B:
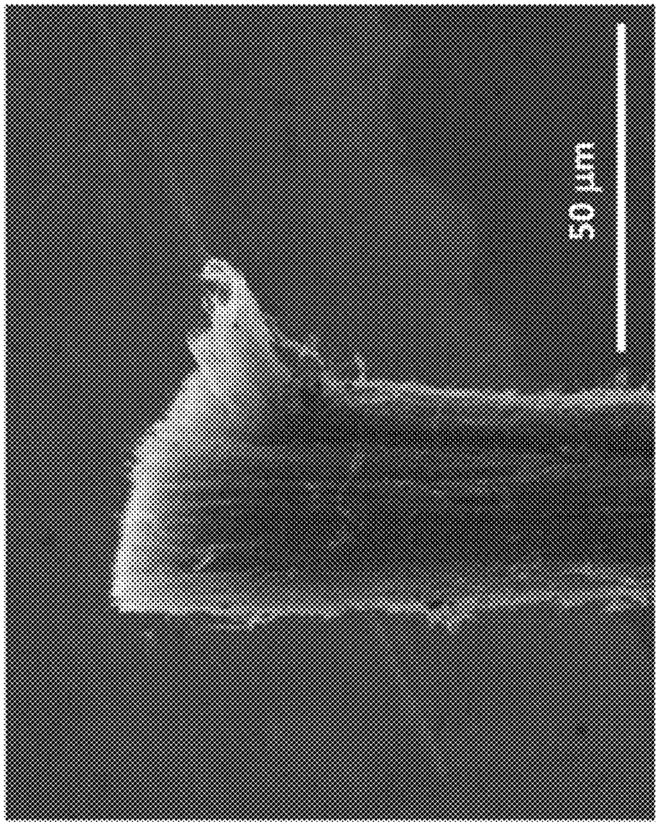
FIGS. 2A-2B depict the non-uniformity of the mechanically-cut end of a CNT fiber.
Figure 2A:
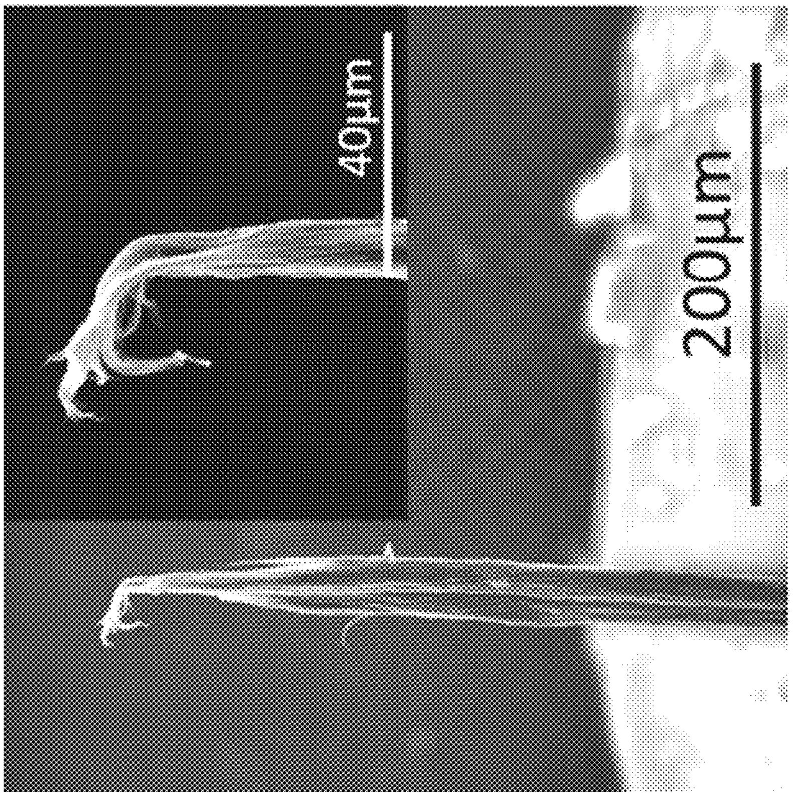
FIG. 2A Prior Art

CNT fibers offer significantly improved performance over carbon fibers when used as FE cathodes, however, they are very flexible, and not rigid like carbon fiber. Therefore, the flocking process cannot be used with CNT fibers. Accordingly, a scalable manufacturing process that may be used to create CNT fiber cathodes with large surface areas is needed. FIG. 7B depicts the results of an initial effort to make a large area, e.g. 1-inch diameter, array of CNT fiber yarn sewn into a cloth backing. The sewing process may be used to create controlled loop heights; thus all of the emitter heights are more uniform than prior art carbon fiber versions (FIG. 7A). The CNT-fiber cathode, when mounted on a metal or other suitable conductive substrate and measured under DC conditions, produced 350 times more current than a 1" diameter flocked carbon fiber cathode (FIG. 7C). This experiment was performed by ramping up the DC voltage from 0-1 kV. As shown in the plot (FIG. 7C), the turn-on voltage for the CNT fiber cathode was approximately one-half that of the flocked carbon fiber cathode. This ability presents significant advantages for HPEM cathodes due to the significantly lower voltage required to generate vacuum electron current. This effort demonstrated that an effective cathode with controlled emitter heights, e.g. +/−10% of the thickness of the fabric, +/−5%, +/−1-3%, +/−3 mm, +/−2 mm. +/−1 mm, may be made from a long continuous, flexible yarns, ribbons, or threads, e.g. CNT fiber yarn, ribbon, or thread, using the loop apex as the emission site. This is in contrast to a flocked fiber cathode where the individual emitters are small cut fibers with one end implanted into the substrate and the other cut end (see FIGS. 1A-1B) serving as the emission site.

Figure 9A:
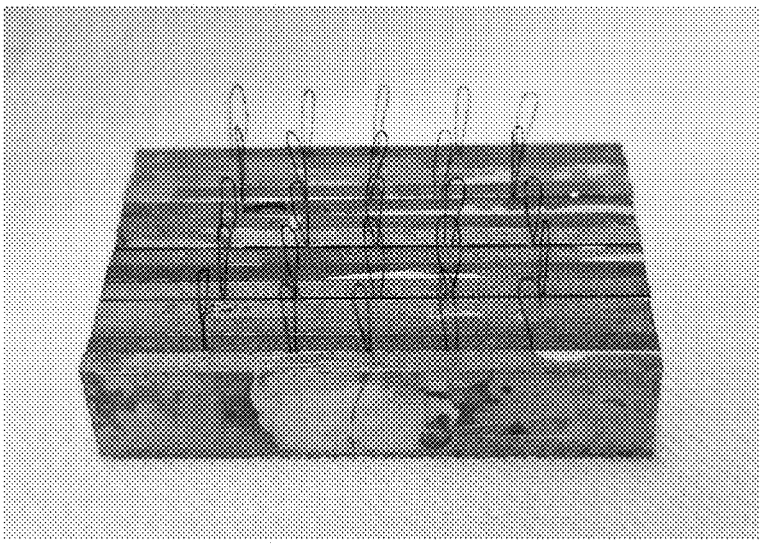
FIGS. 9A-9B present the results of a pulsed voltage experimental comparison (image (b)) of a prior art flocked carbon fiber cathode and a hand-made looped CNT fiber cathode (image (a)).
Figure 9B:
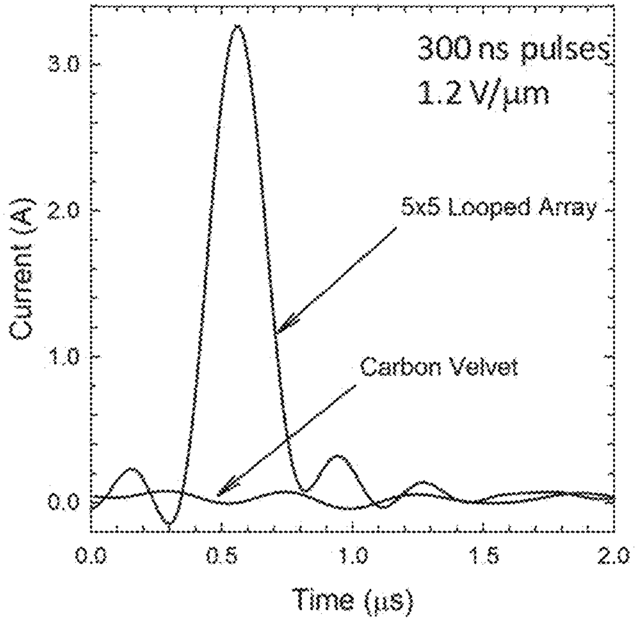

CNT fibers are also far superior electron emitters than carbon fibers when used in pulsed voltage mode rather than DC. This is important since HPEM devices typically operate in a pulsed mode. FIG. 8 shows the high voltage test stand used for pulsed mode testing, and FIG. 9A shows the results for a handmade 1" square 5×5 looped CNT fiber array compared to a 1" diameter flocked carbon fiber cathode (FIG. 7A). The experiments were performed with a 30 kV pulsed voltage power supply. The anode to cathode gap was 25 mm creating a field strength of 1.2V/μm at 30 kV, 300 ns pulse width. As shown in the plot in FIG. 9B, the 5×5 looped CNT fiber array emitted over 3 A of current while the flocked carbon fiber array did not emit measureable current.

Figure 10A:
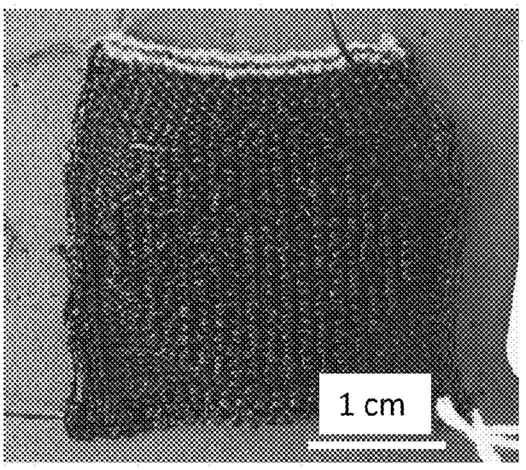
FIGS. 10A-10D present a knitted CNT fiber cathode (FIGS. 10A-10C) and the initial pulsed voltage experimental results (FIG. 10D), according to an embodiment of the present invention.
Figure 10B:
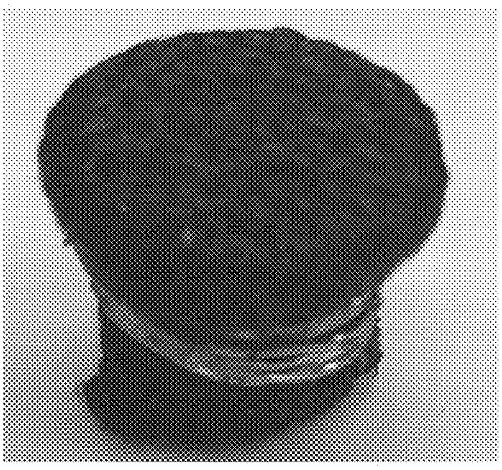
Figure 10C:
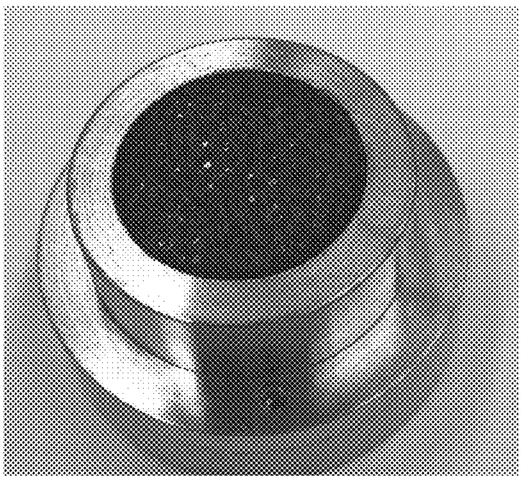
Figure 10D:
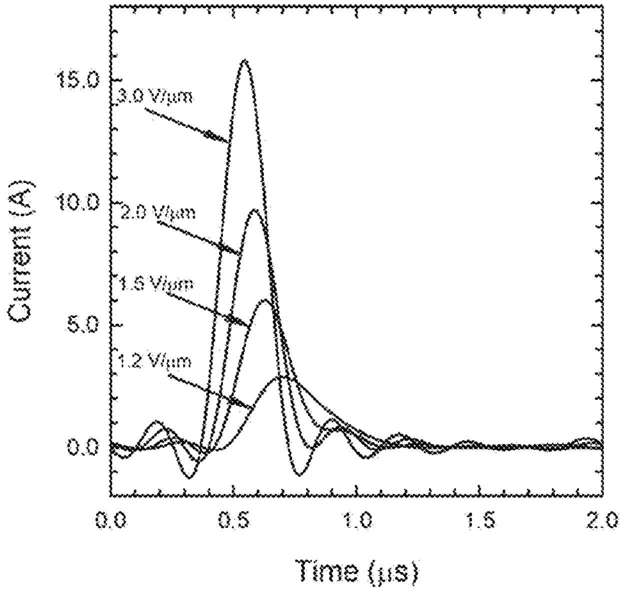

The flexibility of CNT fibers allows them to be twisted into a yarn or thread, or formed into ribbons then knitted, woven, sewn, and/or embroidered using existing textile fabrication techniques. This flexibility makes CNT fibers compatible with traditional textile manufacturing techniques which may be used scale up CNT cathodes into large area, 1" diameter or greater, depending on the size required for testing or the size and cathode geometry needed for an electrode or cathode. Currently, cathodes up to two square feet in size are possible. The fabrication size is limited only by the size of the specific textile manufacturing equipment (generally ranging from centimeters to 1-2 meters in width, and centimeters to many meters in length). FIGS. 10A-10C depict a knit CNT fiber cathode made on an industrial knitting machine at the Pennsylvania Fabric Discovery Center at Drexel University. FIG. 10A depicts a knitted fiber cathode structure comprising a dense pile of loops. FIG. 10B depicts the textile wrapped over a cathode post, and FIG. 10C depicts the outer ring mounted on the cathode-wrapped post. As shown in the plot in FIG. 10D, when tested under pulsed voltage conditions this cathode emitted over 15 A of current for an applied field strength of 3 V/μm, with a 300 ns pulse width.

Knit, woven, sewn, or embroidered cathodes comprising continuous lengths of CNT yarns, ribbons, or threads offer the advantage of improved thermal management over vertically-implanted flocked carbon fiber cathodes due to the continuous path for dissipation of thermal energy. We have demonstrated that a looped, i.e. knit or embroidered, geometry results in less heating and improved thermal management, which increases cathode performance and lifetime, and prevents failure due to thermal damage.

CNT fibers have proven to be superior FE (field emission) cathodes as compared to carbon fiber, which is the current state-of-the-art (SOA). The preferred fabrication technique for SOA carbon fiber cathodes is electrostatic flocking, as explained above. However, this technique cannot be used with CNT fiber due to its flexible nature and the difficulty in achieving a clean cut without fraying the cut fiber end. Instead of flocking, we are therefore using industrial textile manufacturing techniques which do not require cutting the fiber into small segments as does flocking. We are taking advantage of the flexibility of the CNT fiber yarns, ribbons, and threads for use on industrial grade textile manufacturing systems, such as those used for knitting, weaving, sewing, and embroidery. This allows the scalability to larger area (on the scale of square meters) cathode surfaces with CNT fiber yarns, ribbons, and threads, as compared with the flocking technique and rigid carbon fiber.

As described above, we have demonstrated that looped CNT fiber yarns, ribbons, or threads may be used as a cathode structure that offers superior performance to flocked carbon fiber. The CNT fibers emit far more current for the same applied voltage and offer superior thermal performance due to the continuous nature of the long CNT fiber.

Herein we demonstrate superior field emission performance and improved temperature distribution of a continuous CNT fiber emitter in a looped configuration as compared to a traditional single vertical fiber emitter. It was found that the maximum temperature of the looped CNT fiber emitter (~300 ° C.) is significantly reduced compared to that of the vertical CNT fiber (~600 ° C.) when emitting at the same emission current level of 3 mA. This validates the performance of flexible CNT fiber yarn, ribbon, or thread in a continuous knitted structure, as compared to a current SOA velvet-like surface made by flocking many small segments of rigid carbon fiber resulting in vertical emitters implanted into the cathode surface.

A continuously knitted, woven, sewn, or embroidered CNT fiber emitter offers superior thermal management over a vertical emitter due to the additional heat conduction paths to the cathode base. This results in a lower temperature during field emission and thus improved cathode lifetime. IR imaging during FE experiments shows that the maximum temperature of the looped yarn (~300 ° C.) is significantly lower than that of the vertical fiber (~600 ° C.) at the same emission current of 3 mA.

We have developed a looped carbon nanotube arrangement and associated method to scale up carbon nanotube (CNT) fiber yarns, ribbons, and threads into large area conformable carpets, i.e. a carbon nanotube fiber carpet structure, field emitter, electron emitter, or conformable electrode, for large area coverage. This involves knitting, weaving, sewing, and/or embroidering the CNT fiber yarns, ribbons, or threads into a large area structure using conventional textile fabrication techniques. For electrical applications requiring high conductivity, the CNT fiber structure may be mounted to a metallic substrate, e.g. a cathode post. Additionally, metallic fiber yarns, ribbons, or threads may be used in combination with CNT fiber yarns, ribbons, and threads in the textile production processes, incorporated in the same manner as the CNT yarns, ribbons, or threads (i.e. through knitting, weaving, sewing, or embroidery). A conductive bonding contact between the CNT fiber yarn, ribbon, or thread and the conductive substrate may be formed on the bottom side of the substrate after the CNT fiber yarn, ribbon, or thread has been knitted, woven, sewn, and/or embroidered. Electrical contact (conductive bonding) created between the CNT fiber yarn, ribbon, or thread and the substrate, e.g. metal wire mesh or conductive structure, may be created with a bond formed by electroplating, carbon-based epoxies, or similar means.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

The flocking methods used to create prior art carbon fiber cathodes create a velvet-like surface, with small carbon fiber segments having cut ends, which is the current state-of-the-art for HPEM cathodes. The novel device configuration herein includes a surface made from uncut continuous CNT fibers, or CNT fibers that have been twisted into yarn or thread or produced as ribbons. Recently, CNT fibers have successfully been produced in large quantities that can be spooled up to hundreds of meters in length. Our novel application of these CNT fiber yarns, ribbons, and threads places them into industrial knitting, weaving, sewing, and embroidery machines. CNT fabric size is limited only by the size of the equipment used to make it.

This invention includes novel methods of producing field emission cathodes, such as for HPEM devices, using automated textile fabrication techniques, including knitting, weaving, sewing, and embroidery. Before integration into a textile structure, the CNT fiber may be subjected to custom twisting and coating processes. These may include, but are not limited to, twisting together multiple strands of fibers in a one-step process where all fibers are twisted in the clockwise or counterclockwise direction, also known as S and Z twist, twisting together multiple strands of fibers in a multi-step process where twist is applied alternatively in S and Z directions or vice versa, and twisting together multiple strands of yarn, ribbon, or thread with an additional yarn, ribbon, or thread material such as one made from dissolvable poly(vinyl alcohol) to increase knittability and preserve loop structure integrity. These twisting variations and others may be utilized to alter the strength and flexibility of the fibers, and the direction of the twist may be used to create a balanced yarn or thread (such as in the case multiple opposing directions of twist) or an unbalanced yarn or thread, with residual torque energy (such as in the case of a single direction of twist). The CNT fiber yarns, ribbons, or threads may also be coated using traditional fiber finishing processes such as waxing or sizing. The waxing process involves running the yarn, ribbon, or thread across a block of wax. The process of sizing involves running the yarn, ribbon or thread through a liquid solution at a set temperature (for example, a poly(vinyl alcohol) solution), then pressing off the excess solution, and drying at a set temperature. Each process adds a thin coating to the yarn, ribbon, or thread material. This coating may be tailored for purposes such as increasing fiber cohesion, increasing the tensile strength of the yarn, ribbon, or thread, or preventing release of fibers during abrasion. The CNT fiber yarn, ribbon, or thread may then be integrated into a continuous textile architecture using any of the scalable methods disclosed herein.

Figure 12A:
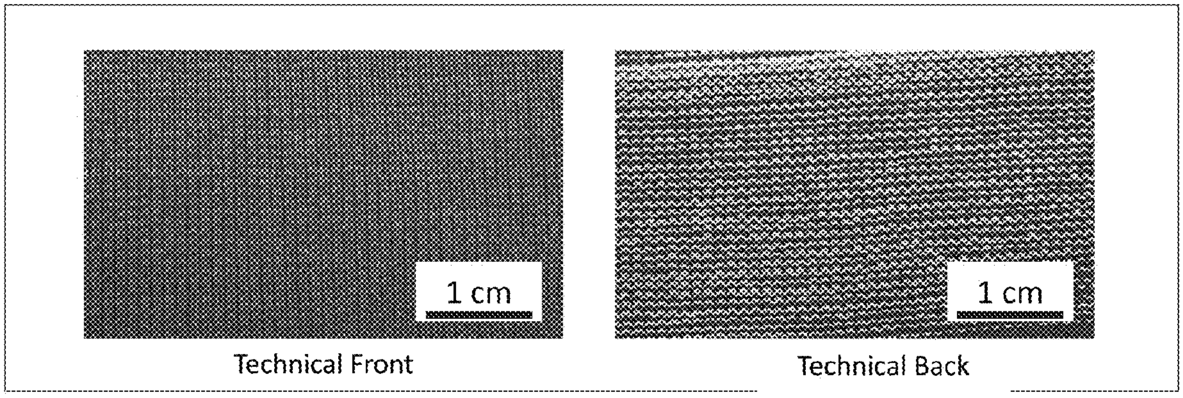
FIGS. 12A-12B present examples of weft knit structures, specifically plating structures and self-folding structures that may be made with CNT fiber yarns, ribbons, or threads that may be used in the production of continuous fiber CNT cathodes using industrial textile fabrication methods.

Textile structures useful for cathode devices include, but are not limited to, the following;

- Weft knit structures (see FIGS. 11A-11E) including jersey (FIGS. 11A-11B), garter, (FIG. 11C), rib, (FIG. 11D), and interlock (FIG. 11E). These structures are produced using regularly repeating patterns of basic knit stitches. Miss stitches and tuck stitches may also be incorporated into such structures to alter the density while preserving the uniformity. The structure shown in FIGS. 11A-11B presents a difference in the technical front and back; the technical back provides the raised loop structure useful for FE cathode devices, while the technical front provides a flat even surface which is very useful for mounting the fabric on a device. In contrast, the structures shown in FIGS. 11C-11E are identical on both the front and back sides.
- Weft knit plating structures used in conjunction with knit structures described above. Plating is used to incorporate a second yarn, ribbon, or thread material, e.g. a conductive yarn, ribbon, or thread material such as stainless steel. Using this technique, the CNT fiber yarn, ribbon, or thread would only be visible on one face of the structure (technical back), while the other conductive yarn, ribbon, or thread material would be visible on both the technical front and back (FIG. 12A). This would allow the CNT surface to be utilized for cathode devices, while the conductive yarn, ribbon, or thread surface underneath would facilitate improved structural support as well as adhesion for mounting the device, e.g. on a cathode post or similar structure providing mechanical support and electrical conduction. FIG. 12A depicts a weft knit plated structure, as viewed from the technical front, where only 1 type of fiber is visible, and as seen from the technical back, where the plated yarn (shown here in silver coated nylon) is also visible.

Figure 12B:
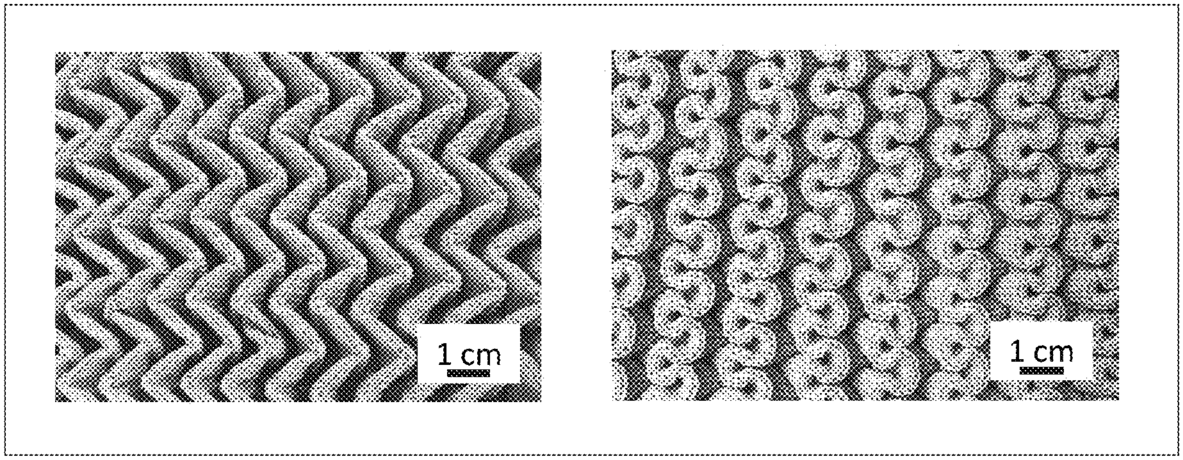

Self-folding weft knit structures, produced using a combination of knit and purl stitches in geometric arrangements resulting in automatic controlled deformation of the textile after manufacture (FIG. 12B). FIG. 12B depicts examples of weft knit self-folding structures (shown here in polyester yarn), which provide raised structures with high stitch density. The size scale of these structures may be tuned based on machine gauge and yarn diameter.

Traditional terrycloth textile structures produced via weft or warp knitting or weaving.

Embroidery onto a conductive non-woven substrate or other conductive fabric, where the CNT is embroidered over a bulky, dissolvable material such as polyvinyl alcohol yarn or thread, which when removed creates a separation between the CNT yarn, ribbon, or thread and the substrate (i.e. a raised loop structure).

3D knit "spacer fabric" structures produced on a weft knitting machine, including but not limited to the following design which has been prototyped and tested by the inventors. "Spacer fabric" is a term used in textile industry to describe a multilayer fabric generally consisting of two outer layers, with an inner layer created by alternatively holding/tucking the yarns, ribbons or threads, between the two distinct layers of fabrics being produced at the same time. The spacer yarn mechanically bonds the layers together while creating space between them.

Variations of the 3D knit structure described above, instead produced on a warp knitting machine or a weaving machine.

Figure 14A:
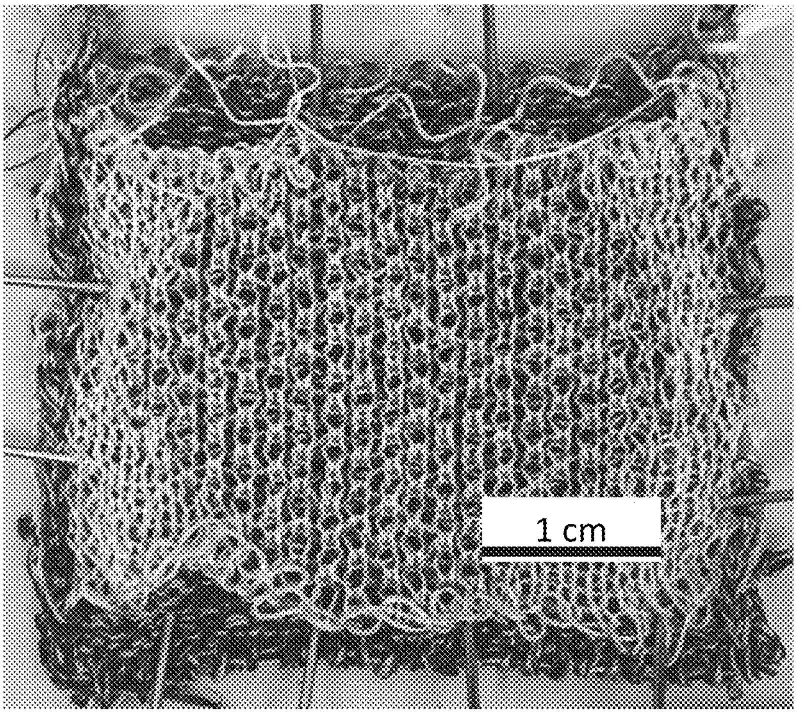
FIGS. 14A-14B present a CNT fiber cathode fabric corresponding to that illustrated in FIGS. 13A-13B, before (FIG. 14A) and after (FIG. 14B) removal of the water-soluble yarn or thread.
Figure 14B:
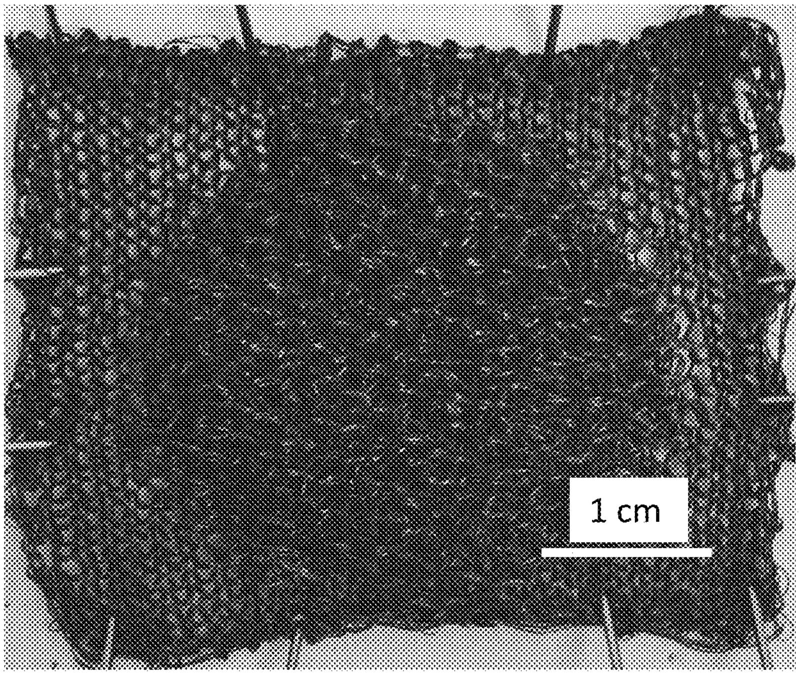

With regard to the 3D "spacer fabric" described above, a specialized knit structure was designed, using spacer fabric techniques to produce a terrycloth-like knit structure with increased uniformity of the loops, resulting in the type of sample shown in FIG. 10A. A diagram of a three-layer fabric structure used is depicted in FIGS. 13A-13B. As depicted in FIG. 13A, layers A and C comprise planes of uniform knit stitches (e.g. jersey knit). In this example, layer A is knit with CNT yarn while layer C is knit with a water-soluble yarn or thread (such as a poly (vinyl alcohol)). Layer B is created by traversing CNT yarn, ribbons, or threads back and forth through the center of the two outer layers, i.e. layers A and C, tucking alternately into the two outer layers to connect into them at regular intervals. The location and geometry of layer B may be varied to tuck into Layers A and C across the entire sample, or in a central circular portion, as desired. After fabrication, the water-soluble yarn or thread (both from layer C, and that which may be twisted with the CNT yarn, ribbon or thread, may be washed away (see FIG. 13B) in warm water using mild agitation, FIGS. 14A-14B depict a sample of CNT yarn/weft knit spacer fabric. FIG. 14A depicts the fabric before the water-soluble stabilizing layer is dissolved and washed away, and FIG. 14B is after.

Figure 15B:
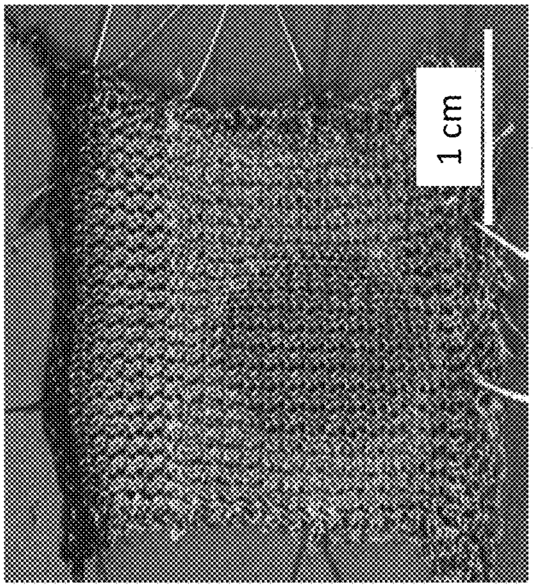
FIGS. 15A-15B present a variation of the structure presented in FIGS. 10A-10D and 13A-13B, demonstrating how a CNT-fiber fabric may be fabricated using three separate yarn, ribbon, or thread materials; a conductive backing, a central portion for the raised CNT loops, and a water-soluble yarn or thread.
Figure 15A:
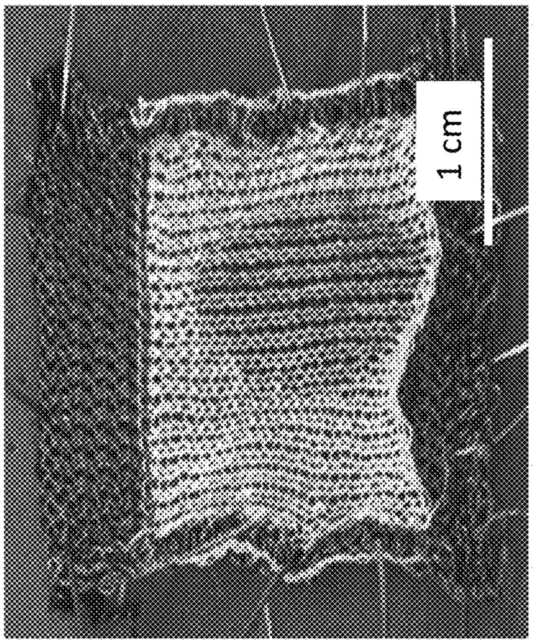

A further variation of this structure may also be produced, in which layer A consists of a conductive yarn, ribbon, or thread material such as stainless steel, layer B consists of CNT yarn, ribbon, or thread, and layer C consists of water-soluble yarn or thread (see FIGS. 15A-15B.) FIGS. 15A-15B depict a weft knit spacer fabric cathode, using a variation in which the backing layer is made from an alternative conductive material yarn, ribbon, or thread, e.g. stainless steel or other desired conducive material. The fabric of FIGS. 15A-15B is shown from both sides, with the water-soluble stabilizing layer visible (FIG. 15A) and with the stainless-steel layer visible (FIG. 15B). In this example, the oval section near the center of the fabric shows where the carbon nanotube cathode loops would be located. The shape and size of this area may be scaled as needed.

Changes in knit architecture such as the arrangements and orientations of the loops, create differences in mechanical behaviors. The self-folding knit structures shown in FIG. 12B provide an example of this. Additionally, a variety of behaviors may be created within one continuous fabric. Variability in properties may also be achieved in woven and warp knit textiles, or through the use of sewing and embroidering processes. Furthermore, the material properties of a yarn, ribbon, or thread will influence the properties of the resulting textiles. In the processing of textile yarns, ribbons, or threads, there are a multitude of variables that can impact textile characteristics, including fiber type, fiber elasticity, degree of twist, direction of twist, and finishes. Both machine parameters (e.g., speed, tension, loop length, and gauge) and environmental conditions (e.g., temperature and humidity) will play a role in the resulting textile. By using CNT as a yarn, ribbon, or thread, we are able to fine tune the geometry and density of the device by a variety of traditional textile processes, to suit a wide variety of field emission cathode applications.

The methods described here provide a significant advantage over the prior art flocking process in that they create a surface made from continuous (rather than small cut segments) CNT fiber yarns, ribbons, or threads, which are demonstrated to exhibit increased emission current and lower operating temperatures than the vertical carbon fiber structure produced by flocking. Additionally, these production processes use long established, reliable and scalable textile manufacturing technologies, ensuring uniformity of the loop structures that are formed.

CONCLUSIONS

We have developed a continuous CNT fiber arrangement that offers significant advantages over the existing short-segmented vertical fiber arrangements, particularly within field emitters and related devices. We have studied the field emission and temperature distribution from a looped CNT fiber yarn and compared it with a single vertical CNT fiber. For both emitters, the field emission current level of mA can be easily reached with an applied DC voltage of <1000 V, demonstrating their excellent field emission properties. For the same emission current of 3 mA, the maximum temperature of the looped yarn (~300 ° C.) was significantly lower than that of the vertical fiber (~600 ° C.). For pulsed mode testing the current increased by 1000× from 3 mA to 3 A when using voltages up to 30 kV with 300 ns pulse widths. The temperature dependent electrical and thermal conductivities were also measured for the CNT fiber. Our novel configuration of a looped CNT fiber yarn, ribbon, or thread provides the opportunity to significantly improve the thermal management of field emitters, which may be expected to improve the reliability and lifetime of field emitters for high power and high current operations.

As described above, CNT fibers provide an advantage over carbon fibers. Their electrical conductivity is two orders of magnitude greater than carbon fiber, they exhibit lower turn-on voltages, and they have been shown to produce 350 times more current per equivalent field strength under DC testing. We have demonstrated that a surface consisting of continuous carbon nanotube (CNT) fiber yarns, ribbons, or threads offers superior performance over vertically-mounted carbon fiber velvet.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An electrode comprising a conductive textile structure having an inner surface that is connected to one of an electrical power supply or an electrical ground;

the conductive textile structure having an outer surface, the outer surface comprising a carbon nanotube (CNT) fiber fabric fixed thereon, the CNT fiber fabric having continuous CNT fiber on the outer surface, wherein the CNT fiber fabric is made from the continuous CNT fiber, and is at least one of knitted, sewn, or embroidered, so that at least one of the outer surface or the inner surface of the CNT fiber fabric comprises the continuous CNT fiber that forms emitter loops.

2. The electrode of claim 1, wherein the electrode is one of a cathode, field emission device, an electron emitter, or a conformable electrode.

3. The electrode of claim 1, where in the continuous CNT fiber is at least one of a yarn, ribbon, or thread.

4. The electrode of claim 1, wherein the CNT fiber fabric includes at least one face having a looped or interlaced structure made from the continuous CNT fiber.

5. The electrode of claim 1, wherein when the CNT fiber fabric is sewn, the CNT fiber fabric comprises one of a woven terrycloth structure and a sewn structure, when the CNT fiber fabric is embroidered, the CNT fiber fabric comprises an embroidered structure, when the CNT fiber fabric is knitted, the CNT fiber fabric comprises at least one of a weft knit structure, a weft knit plating structure, a self-folding weft knit structure, a knit terrycloth structure, a warp knit structure, or a 3D knit spacer fabric structure that forms at least one of an outer surface or an inner surface of the electrode.

6. The electrode of claim 1, further comprising a conductive bond between the conductive structure and the CNT fiber fabric.

7. The electrode of claim 6, wherein the conductive bond between the conductive structure and the CNT fiber fabric comprises one or more conductive adhesive, selected from the group consisting of a carbon-based epoxy, a silver epoxy, a CNT-containing adhesive, a nanocarbon-containing adhesive, electroplating bond, or vacuum brazing.

8. The electrode of claim 1, wherein the CNT fiber fabric further comprises at least one additional conductive yarn, ribbon or thread selected from the group consisting of stainless steel, graphite, carbon, or copper.

9. The electrode of claim 1, wherein the knit CNT fiber fabric is a weft knit fabric and is made in one or more knit stitch patterns selected from the group consisting of a jersey knit, a garter knit, a rib knit, and/or an interlock knit.

10. The electrode of claim 1, wherein the CNT fiber fabric further comprises a weft knit plating structure that comprises a second yarn, ribbon or thread material selected from the group consisting of a conductive yarn, a stainless steel yarn, a graphite yarn, a carbon yarn, or copper yarn that is visible on both faces of the CNT fabric, wherein the continuous CNT fiber is visible on only one face of the CNT fiber fabric.

11. The electrode of claim 1, wherein when the CNT fiber fabric is sewn, the CNT fiber fabric is a woven terrycloth, and when the CNT fiber fabric is knitted, the CNT fiber fabric is a terrycloth structure comprising at least one of a weft-knitted terrycloth and a warp-knitted terrycloth.

12. An electrode comprising a conductive textile structure having an inner surface that is connected to one of an electrical power supply or an electrical ground;

the conductive textile structure having an outer surface, the outer surface comprising a carbon nanotube (CNT) fiber fabric fixed thereon, the CNT fiber fabric having continuous CNT fiber on the outer surface, wherein the CNT fiber fabric is at least one of knitted, woven, sewn, or embroidered, wherein the CNT fiber fabric is knitted, woven, sewn, or embroidered so that at least one of the outer surface or the inner surface of the CNT fiber fabric comprises the continuous CNT fiber and forms a plurality emitter loops, wherein the knitted, woven, sewn, or embroidered inner surface and/or outer surface of the CNT fiber fabric further comprises a weft knit plating structure that comprises a second yarn, ribbon or thread material selected from the group consisting of a conductive yarn, a stainless steel yarn, a graphite yarn, a carbon yarn, or copper yarn that is visible on both faces of the CNT fabric, wherein the continuous CNT fiber is visible on only one face of the CNT fiber fabric.

* * * * *